B. W. FJELLMAN.
BALL RETAINER OF SHEET METAL FOR BALL BEARINGS.
APPLICATION FILED NOV. 25, 1913.
1,224,624. Patented May 1, 1917.
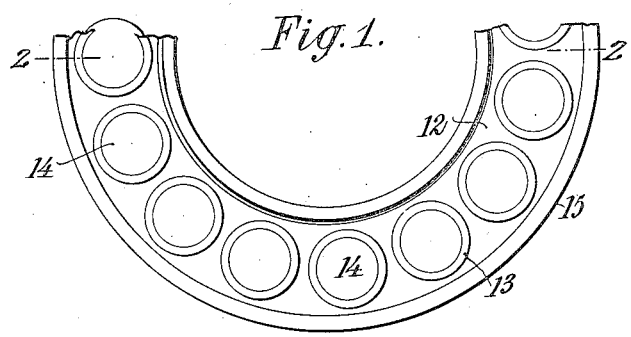
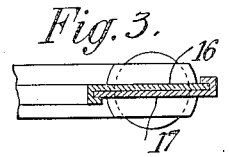
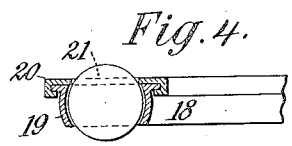
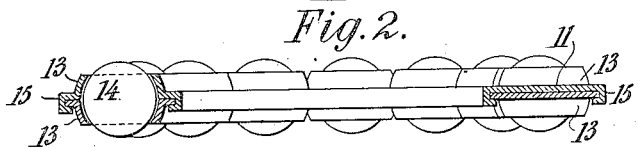
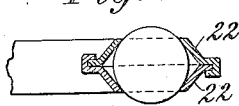
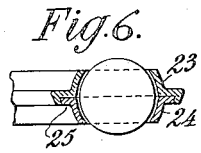
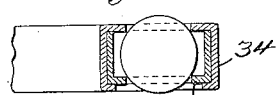
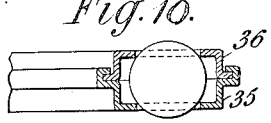
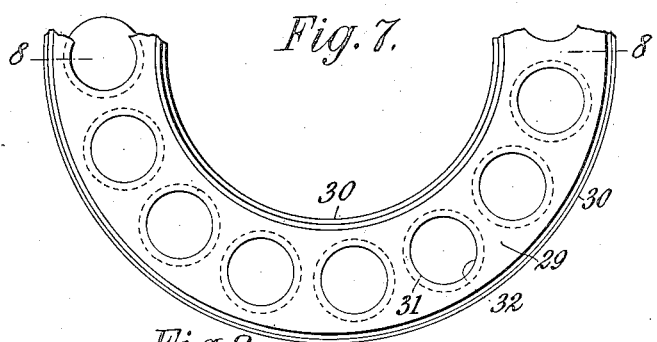
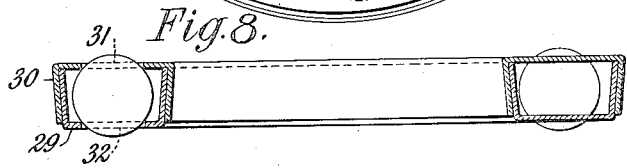
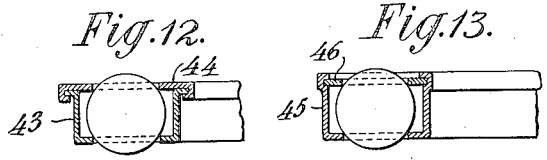
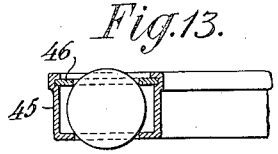
WITNESSES: 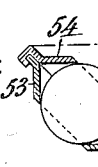 
INVENTOR:
Bengt Wiktor Fjellman
By Attorneys,
Fraser, Trubee & Myers

UNITED STATES PATENT OFFICE.

BENGT WIKTOR FJELLMAN, OF SÄFVE STRANDGATA, GOTTENBORG, SWEDEN, ASSIGNOR, BY MESNE ASSIGNMENTS, TO S. K. F. BALL BEARING COMPANY, OF HARTFORD, CONNECTICUT, A CORPORATION OF CONNECTICUT.

BALL-RETAINER OF SHEET METAL FOR BALL-BEARINGS.

1,224,624.        Specification of Letters Patent.        Patented May 1, 1917.

Application filed November 25, 1913. Serial No. 802,880.

*To all whom it may concern:*

Be it known that I, BENGT WIKTOR FJELLMAN, a subject of the King of Sweden, residing in Säfve Strandgata, Gottenborg, Sweden, have invented certain new and useful Improvements in Ball-Retainers of Sheet Metal for Ball-Bearings, of which the following is a specification.

This invention relates to and has for an object to provide ball retainers for ball bearings, the improvement is especially adapted for use in ball retainers constructed of sheet metal. In the illustrated embodiment of the invention the entire retainer consists of a plurality of rings or disks of sheet metal provided with openings (circular, oval or of any other shape) which are located opposite each other two by two and contain the balls in such manner, that every ball projects through an opening in each ring or disk and is inclosed by the edges of the said openings.

In ball retainers of the said type the rings or disks generally have been connected by screws, rivets or other individual parts, which can easily get loose and bring about damage. The object of this invention is to provide a ball retainer of the type in question which is strong, simple and cheap and in which the rings or disks are connected substantially and firmly into an integral structure without the use of free parts.

For that purpose the rings or disks of sheet metal according to this invention are so shaped and arranged one with relation to the other (while the openings remain in co-axial positions), that the edges of one of the disks or rings project beyond the edges of the other disk or ring, or each of the rings or disks has one of its edges projecting beyond the corresponding edge of the other ring or disk, the rings or disks being permanently connected at their edges by the projecting part of one of the rings or disks being turned around the edge of the other ring or disk. Owing to the fact that the material forming the rings or disks is turned around in the said manner along the whole length of the edges of the rings the ball retainer of the said construction is well stayed, so that a substantial and firm ball retainer is gained also from comparatively thin sheet metal.

The turned over parts of the edges, evidently, need not be greater than that a reliable connection of the rings or disks is effected. For instance, the edges of one of the rings or disks may be beveled or the said ring or disk may have side walls extending upward in an oblique direction, and the ring engaged by the turned over part of the other ring or disk only at the beveled side or along the said side walls.

For a more particular explanation of the invention reference is made to the accompanying drawings.

Figure 1 is a plan view, and
Fig. 2 a central section (on the line 2 to 2 of Fig. 1) of a ball retainer of the said type and adapted for end thrust bearings, to which the invention is preferably applicable.

Figs. 3 to 6 inclusive are sectional views showing several modifications.

Fig. 7 is a plan view, and
Fig. 8 is a central section (on the line 8 to 8 of Fig. 7) of a ball retainer, which is arranged in accordance with this invention and also is adapted to end thrust bearings.

Figs. 9 to 13 inclusive show in sectional views modifications of the form shown in Figs. 7 and 8, and Fig. 14 is a view partly sectional and partly diagrammatical showing a form of the invention adapted to a socalled conical bearing.

The ball retainer shown in Figs. 1 and 2 consists of two solid rings 11, 12 of sheet metal provided with sockets formed by pressing the material outward, the outer ends of such sockets being open. The said rings have different widths and are located with the wider ends of the sockets close by each other and connected at their outer and inner edges by the projecting edge of the wider ring being bent around the edge of the narrower ring. The ball sockets 13 in the illustration are shaped, in the known manner, as spheric segments, which fit closely to the balls 14 or between the inner sides of which and the balls narrow spaces are provided. The halves of the ball retainer are manufactured preferably by punching a number of openings, corresponding to the number of balls in the originally flat rings and then forcing outward to the desired shape the material located around the openings. If desired, suitable recesses may, evidently, first be formed by pressing, in which the openings are then punched. After the balls have been placed in the recesses of one of the rings, the other ring is located over the balls, so that the balls are confined in their respective sockets. The projecting edges 15 of the wider ring 11 are then bent around the edges of the narrower ring 12.

The form of the ball retainer shown in Fig. 3 differs from the form described above only by the two rings 16, 17 of sheet metal having substantially the same width but the diameter of one 16 being shorter than the diameter of the other ring 17. The rings are connected by bending one edge of each ring around the edge of the other ring.

Fig. 4 illustrates another modification which differs from the form shown in Figs. 1 and 2 in that one only of the rings, namely, 18, is provided with sockets 19 formed by pressing, while the other ring 20 is provided with simple openings 21.

The ball retainer shown in Fig. 5 corresponds with the retainer shown in Fig. 3 concerning the connecting device and differs from the same in that the shape of the ball sockets 22 is not spherical.

The form of the invention shown in Fig. 6 corresponds closely to the form shown in Figs. 1 and 2 from which it differs, however, by the fact that the wider ring 23 engages only the beveled edges 24 of the narrower ring 25.

All the forms shown in Figs. 1 to 6 inclusive correspond one to the other by the retainers comprising two substantially plane rings, located close to each other and provided with open ball sockets formed by pressing the material outward. In the form shown in Figs. 7 and 8 on the other hand the rings 29, 30 of the retainer consist of bodies of revolution trough-shaped in cross section, so that they form circular channels, which are fully open at one side, and in the bottoms of which, openings 31, 32, for the balls, are provided. The inner ring 29 has the shape shown in the drawings, as the parts are put together, i. e. its side walls extend in an oblique direction, while the side walls of the outer ring 30 preferably form right angles with the ring, as the parts are put together, and after the parts of the ball retainers have been located on the balls are forced against the side walls of the ring 29, so that the rings are firmly connected.

The forms shown in Figs. 9 to 13 inclusive correspond with the form shown in Figs. 7 and 8, the parts of the ball retainers in all the said figures consisting of bodies of revolution provided with simple openings for the balls. The form shown in Fig. 9 differs from that previously described in that the side walls of the rings 33, 34 form right angles with the bottom plane and the side walls of the outer ring 34 are shown bent inward below the bottom of the inner ring 33. In Fig. 10 the edges of the side walls of the rings 35, 36 are bent outward and form flanges, which are parallel with the bottom walls. The flange of one of the rings 35 is broader than the flange of the ring 36 and bent around the flange of the latter. In Fig. 11 each of the rings 41, 42 comprises a bottom wall and only one cylindrical side wall, located at the one edge of the said bottom wall, after the parts have been put together, inclosing the balls, the said side wall is bent around the free edge of the bottom wall of the other ring. In Fig. 12 only one 43 of the rings is trough-shaped, while the main shape of the other ring 44 is plane; the edges of the ring last mentioned are bent around the outward and inward extending edges of the side walls of the trough-shaped ring. In Fig. 13 the parts have substantially the same shape as those shown in Fig. 12, but the connection differs in some respect from the one shown in the figure last mentioned viz: by the edges of the side walls of the trough-shaped ring 45 being so bent that they form grooves facing inward and containing the edges of the plane ring 46.

Though all Figs. 1 to 13 inclusive show the invention applied to end thrust bearings, it is evident from the above description that the sections shown may be used also in radial bearings of the type in which the ball retainer with the balls as a whole can be located in the bearing. In radial bearings of the type in which the said inserting operation is impossible, the openings of one ring or both rings of the retainer may be made sufficiently wide for the introduction of the balls from the outside. In such case ball retainers of the types shown in Figs. 2 to 6 inclusive may be finished without balls and the rings contracted around the balls when located in the same. The same arrangement may, if desired, be used also in ball retainers for end thrust bearings.

For a combined end thrust and radial bearing a ball retainer of the construction shown in Fig. 14 may be used, in which the main shape of the rings 53, 54 preferably is conical but the arrangement in other respects is of the type described above. The rings may, evidently, have a conoidal or any other suitable curved shape.

The invention is not confined to the precise forms shown and described as examples but includes modifications coming within the scope of the claims, and which may be made without difficulty by those skilled in the art. For instance, the bent over part or parts of the rings or disks of the ball retainer may be cut or formed as tongues, although such an arrangement may not be practical, for the reason that it weakens the retainer. In ball bearings, through which the shaft does not extend, the retainer, evidently, need not be provided with a central opening, but two disks or the like, provided with openings or sockets for the balls may be used, which are connected only at their outer edges in the manner described above. Also when the two parts of the ball retainer are ring-shaped, the rings may be connected only at one edge (the inner or the outer as desired), the connection, however, at both edges being preferred.

What I claim is:

1. A ball retainer for ball bearings, consisting of a plurality of rings or disks of sheet metal provided with openings for the balls, such rings being so located, that the said openings are opposite each other by pairs, the edge of one of the rings or disks projecting beyond the edge of the other ring or disk, and bent around the edge of the said other ring, the same having a beveled face engaged by the turned over part of the first ring or disk.

2. A ball retainer for ball bearings, consisting of a plurality of rings or disks of sheet metal provided with openings for the balls, such rings being so located that the said openings are opposite each other by pairs, the rings being provided with turned up side walls, the edges of one of the rings embracing the edges of the other ring.

3. A ball retainer for ball bearings, consisting of a plurality of rings or disks of sheet metal provided with openings for the balls, such rings being so located that the said openings are opposite each other by pairs, the side walls of the rings extending obliquely with relation to the intermediate part, and the rings being connected only by the oblique relation of the side walls.

4. A ball retainer comprising two trough-shaped members each having a bottom portion provided with openings for the balls, and side walls disposed obliquely to bottom wall, the side walls of the respective troughs being interlocked.

In witness whereof, I have hereunto signed my name in the presence of two subscribing witnesses.

BENGT WIKTOR FJELLMAN.

Witnesses:
KARL RUNESKOG,
IVAR LARSJON.